Sept. 2, 1941.   G. W. DE BELL   2,254,473
AEROPLANE VIBRATION DAMPENER
Filed Jan. 16, 1935
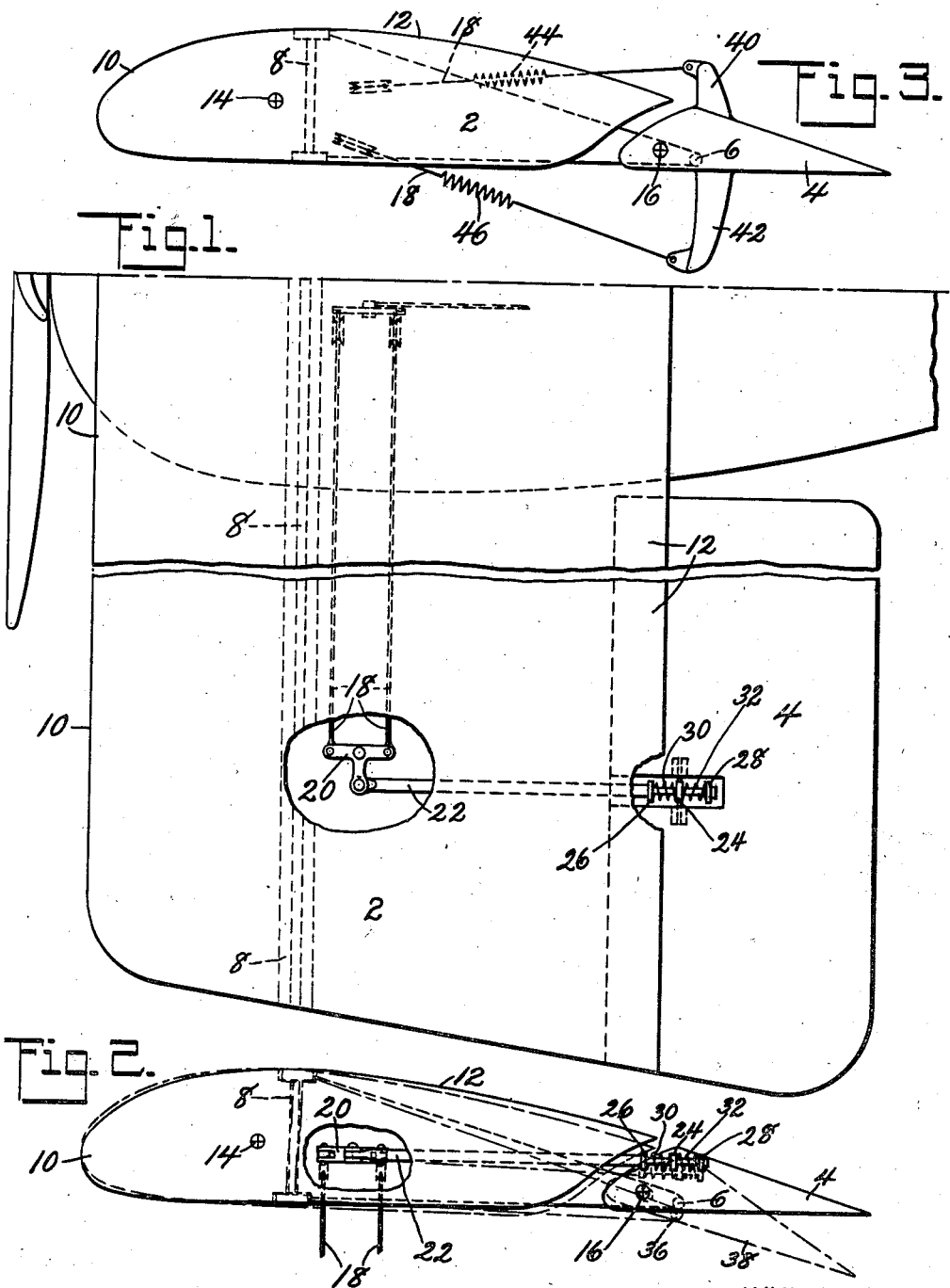
INVENTOR
George W. DeBell
BY Donald U. Rich
ATTORNEY Patented Sept. 2, 1941

2,254,473

UNITED STATES PATENT OFFICE 2,254,473

AIRPLANE VIBRATION DAMPENER

George W. De Bell, Berwick, Pa.

Application January 16, 1935, Serial No. 2,089

22 Claims. (Cl. 244—75)

Systems have previously been devised whereby the stability of an airplane or other body moving through a fluid medium is obtained. These systems have been of a more or less complicated nature and since they deal with the stability of the body as a unit have necessarily had a rather harmful effect on the maneuverability of the body and ease of maneuverability is a prime requisite especially in a fighting ship.

Previous systems have been more in the nature of automatic pilots whereby the body as a whole is maintained in a normal state of flight against all disturbing influences whether these be set up by the pilot, by eddies or by cross currents in the fluid medium. None of the previous known systems have dealt with the stability of the component parts of the body and, using an airplane as an example, it is well known that destructive wing vibrations may be set up even in a stabilized airplane.

Wing and tail surface vibrations have previously been counteracted by making the structure stronger and more rigid than was necessary for ordinary flight. Making the structure more rigid adds of course more dead weight and does not correct the vibration tendency but simply shifts the danger point out of the range of normal flight.

This invention deals with means to dampen or check vibrations in a body moving through a fluid medium and especially such bodies as airplane wings or tail surfaces.

It is an object of this invention to overcome vibrations within a body moving through a fluid medium.

A further object of this invention is the provision of means to dampen vibrations in bodies such as airplane wings and tail surfaces whereby the weight of the body may be reduced.

It is a further object of this invention to provide vibration dampening means so arranged as to not affect the maneuverability of the body to which it is applied.

It is a still further object of this invention to provide vibration controlling means which will not effect the head resistance of the body to which it is applied.

These and other objects and advantages of the present invention will be apparent to one skilled in the art from a study of the accompanying description taken in connection with the drawing in which Figure 1 is a plan view showing the invention applied to an airplane wing and showing substantially one-half of the airplane;

Fig. 2 is an end view of the wing, and

Fig. 3 is an end view of a wing with a modified form of the invention applied thereto.

Referring now to the drawing the invention is shown as applied to an airplane wing or airfoil 2 of conventional outline having the aileron 4 of conventional outline attached thereto by hinges 6. The wing or airfoil is shown as constructed with a single spar 8 extending throughout the length of the wing and having attached thereto the front portion 10 preferably of metal and the rear portion 12 preferably of fabric. Such a wing structure reduces the total dead weight and is possible on high speed airplanes when using a structure in which vibrations are substantially eliminated. The elastic centrum of the wing is indicated at 14 and is the point about which the wing structure would tend to rotate when subjected to pure torsion.

The aileron or flap which as stated previously is of conventional outline is hinged to the wing structure as at 6 and is so built that its center of mass is located at a point such as 16 always between the aileron or flap hinge and the wing, and since the aileron is of conventional outline the center of pressure will always be to the rear of the hinge axis or, in other words, on the side of the hinge axis opposite the center of mass. That is, the center of mass and center of pressure will always be on opposite sides of the aileron or flap hinge under all conditions of service. The aileron should be built as light as possible and weights added if necessary to shift the center of mass to a point ahead of the hinge all of which will, of course, not effect the location of the center of pressure. The aileron controls cables 18 are coupler to the crank 20 within the wing and the crank has coupled thereto a rod 22 extending to the aileron. A lug 24 is rigidly attached to the aileron and slidably supports the rod 22 which is provided with stops 26 and 28 which may be made adjustable on the rod if desired. Elastic means such as compression springs 30 and 32 surround the rod and have bearing on the lug and respective stop. The elastic means will be chosen having the proper characteristics for the aileron and wing combination and may if desired be placed under an initial compression to give the control connections more or less rigidity. It is thus seen that the aileron is coupled for control by the pilot yet may have controlled motion due to the springs independent of the pilot's controls in other words the ailerons may float between definite limits.

In operation and assuming the wing of Fig. 2 is given a sudden rotational movement, such as would be caused by vibration, the wind would tend to rotate about the elastic centrum 14 to the dotted line position thus causing a sudden lowering of the aileron or flap hinge 6 to a new position 36. The sudden lowering of the hinge would cause, due to the center of mass 16 being ahead of the hinge, a momentary rotation of the aileron to the new position 38 independent of the control setting. The elastic means or spring 32 would of course be compressed to permit of this motion. With the aileron in the new temporary position it exerts a restoring force as is obvious on the wing counteracting or tending to counteract the wing motion since the center of pressure is behind the pivot. A similar action takes place when the wing tends to rotate in a counter-clockwise direction in which case the elastic means or spring 30 is compressed and the aileron hinge moves upward causing an upward momentary tilting of the aileron.

Likewise, if the wing is given a sudden movement in a vertical direction, such as downward, the aileron would be moved and tilted downward slightly causing a momentary lift or restoring action to take place.

It is thus seen that any sudden wing movements are counteracted and balanced or dampened by the aileron regardless of the control settings and is analogous to the counter-balancing of reciprocating parts wherein a substantially equal and oppositely acting force is used to counteract the original impulse.

In the modification of Fig. 3 the relation of parts and masses is the same as previously described and like numerals are used to refer to like parts. The aileron in this case is provided with horns 40 and 42 controlled through elastic means such as tension springs 44 and 46 respectively. The elastic means has preferably associated therewith some safety means such as a slack wire or cage to limit the extension of the spring and prevent loss of control in case the spring should break. The action of this aileron is exactly similar to that just preceding and a description is therefore unnecessary.

The term control member as used in the appended claims is intended to apply to any member attached to another member for movement relative thereto and for purposes of control.

Although the device has been described as applied to an airplane wing it is of equal value on airplane tail surfaces, boat rudders, torpedoes, or in fact any body moving in a fluid which might be subjected to sudden movements and is to be limited only in accordance with the appended claims.

What is claimed is:

1. In a self-acting steadying device for members moving in a fluid, a main member capable of vibration, a control member, means connecting the control member adjacent the edge thereof to said main member for movement relative thereto, said control member being so constructed that its center of mass lies between said means and the main member and its center of pressure lies on the opposite side of said means from the main member, resilient controlling means connected to the control member and to the main member, said resilient means cooperating with the control member to permit vibrations of the member which oppose the vibrations of the main member.

2. In an airplane, an airfoil in which vibrations may be set up, a member pivoted adjacent an edge of said airfoil, normal control means connected to said member and to said airfoil, resilient means interposed in the connection between said control means and said member to permit movement of the member independent of the control means, said member having its center of mass ahead of said pivot and its center of pressure to the rear of said pivot whereby under control of the resilient means automatic movements of the member are permitted which oppose the vibration of the airfoil.

3. A dampener for airfoils which are subject to vibration comprising, a controlled member pivoted adjacent an edge of said airfoil, normal control means connected to said member, resilient means interposed in the connection between the control means and said member permitting movement of said member relative to the normal control means, said member having its center of mass between said pivot and said airfoil and its center of pressure on the opposite side of said pivot from said airfoil whereby vibrations of the member will be set up under control of the resilient means which counteract the airfoil vibrations.

4. In an airplane, an airfoil secured to the airplane, a member pivoted to the rear edge of said airfoil and having its center of mass ahead of said pivot and its center of pressure behind said pivot, control means for said member, resilient means connecting said control means and said member and permitting movement of the member independent of the control means whereby said member will be operated automatically and independently of the control means to counteract undesirable airfoil movements.

5. In an airplane, an airfoil secured to the airplane, said airfoil being subject to vibrations during operation of the airplane, a member pivoted to an edge of said airfoil, said member having its center of mass between said pivot and said airfoil and its center of pressure on the side of the pivot remote from the center of mass, control means for said member, projecting means on said member, resilient means connecting said projecting means and said control means whereby vibrations of said airfoil will set up opposing vibrations in said member independent of said control means.

6. In an airplane, an airfoil secured to the airplane, said airfoil being subject to vibrations during operation of the airplane, a member pivoted to an edge of said airfoil, said member having its center of mass between said pivot and said airfoil and its center of pressure on the side of the pivot remote from the center of mass, normal control means for said member, projecting means on the member supporting said control means, stops on the control means, resilient means interposed between said stops and projecting means whereby vibrations of said airfoil will set up opposing vibrations in said member independent of said normal control means.

7. In an airplane, a fuselage, a wing secured to the fuselage, said wing being subject to vibrations during operation of the airplane, an aileron pivoted to the wing adjacent the trailing edge of said wing, said aileron being constructed with its center of mass between said pivot and wing and its center of pressure on the opposite side of the pivot from the wing, control means for said aileron, projecting means on said aileron, resilient means connecting said projecting means and said control means, whereby vibration of said wing will set up opposing vibrations in said aileron independent of said control means.

8. In an airplane, a wing secured to the airplane, said wing being subject to vibrations during operation of the airplane, an aileron pivoted to an edge of said wing, said aileron having its center of mass between said pivot and said wing and its center of pressure on the opposite side of the pivot from the wing, normal control means for said aileron, projecting means on the aileron supporting said control means, stops on the control means, resilient means interposed between said stops and projecting means whereby vibrations of said wing will set up opposing vibrations in said aileron due to its construction and attachment the wing independent of said normal control means.

9. In an airplane, an airfoil which may have oscillatory movement, a control member pivotally connected to said air foil on an axis adjacent an edge thereof, normal control means for said control member, projecting means on the control member supporting said control means, stops on the control means, resilient means interposed between said stops and projecting means and permitting oscillatory movement of the control member independent of the control means, said control member having its center of mass ahead and its center of pressure to the rear of said pivotal axis whereby in conjunction with the resilient means oscillatory movements of the control member will be set up which oppose the oscillatory movements of the air foil.

10. In an airplane, an airfoil which may vibrate, a member pivoted to said airfoil, control means for said member, projecting means on the member, resilient means connecting said projecting means and said control means to thereby permit vibratory movement of the member independent of the control means, said member having its center of mass ahead of and its center of pressure to the rear of said pivot whereby in conjunction with the resilient means vibratory movements of the member will be set up which oppose the vibratory movements of the airfoil.

11. In an airplane, a first airfoil secured in fixed relation to said airplane, a second airfoil pivotally connected to the rear portion of the first airfoil and having its center of mass ahead of the pivotal axis and its center of pressure to the rear of the pivotal axis, resilient means connecting said second airfoil to a point within said first airfoil and permitting limited movement of said second airfoil whereby sudden movement of said first airfoil will cause tilting of said second airfoil to produce a restoring force on the first airfoil.

12. In an airplane a first air foil secured in fixed relation to and forming part of said airplane, a second air foil pivotally connected to the first air foil on an axis adjacent the rear portion thereof, said second air foil having its center of mass ahead of the pivotal axis and its center of pressure to the rear of the pivotal axis, resilient means connecting said second air foil to said first air foil independently of said pivotal connection, said resilient means permitting limited movement of said second air foil whereby sudden movement of said first air foil will cause a slight tilting of said second air foil thereby producing a momentary restoring force on the first air foil.

13. In an airplane a first air foil secured in fixed relation to and forming part of said airplane, a second air foil pivotally connected to the first air foil on an axis adjacent the rear portion thereof, said second air foil having its center of mass ahead of the pivotal axis and its center of pressure to the rear of the pivotal axis, normal controls for said second air foil connecting said second air foil to said first air foil independently of said pivotal connection, resilient means interposed in the normal controls and permitting limited movement of said air foil independently of said normal control whereby sudden movement of said first air foil will cause tilting of said second air foil thereby producing a restoring force on the first air foil.

14. In an airplane the combination of, a first air foil attached to said airplane, a second air foil pivotally connected to the first air foil on an axis adjacent the rear edge thereof, said second air foil being constructed with its center of mass ahead of the pivotal axis and its center of pressure to the rear of the pivotal axis, resilient means connecting said second air foil to said first air foil independently of said pivotal connection, said resilient means permitting limited movement of said second air foil whereby sudden movement of said first air foil will cause tilting of said second air foil thereby producing a restoring force on the first air foil.

15. In an airplane the combination of, a first air foil attached to said airplane, a second air foil pivotally connected to the first air foil on an axis adjacent the rear edge thereof, said second air foil being constructed with its center of mass ahead of the pivotal axis and its center of pressure to the rear of the pivotal axis, resilient means connecting said second air foil to said first air foil independently of said pivotal connection, said resilient means being selected in accordance with the first and second air foil construction to permit limited movement of said second air foil whereby sudden movement of said first air foil will cause tilting of said second air foil thereby producing a restoring force on the first air foil.

16. In a self acting steadying device for members moving in a fluid, a main member, a control member pivoted to said main member for normal control, said control member being so constructed that its center of mass lies between said pivot and the main member and its center of pressure on the opposite side of said pivot from the main member, and resilient controlling means connected to the control member permitting limited independent movement thereof whereby said control member may function automatically to oppose abnormal movement of said main member.

17. In an airplane, an airfoil secured to the airplane, a member pivoted to said airfoil adjacent an edge of the airfoil, said member being constructed with its center of mass ahead of and its center of pressure to the rear of said pivot, control means for said member, resilient means connecting said control means and said member and permitting movement of the member independent of the control means whereby said member may operate automatically to counteract undesirable airfoil movements.

18. A dampener for airfoils which are subject to vibrations comprising a resiliently controlled member pivoted to said airfoil, said resiliently controlled member having its center of mass between said pivot and said airfoil and its center of pressure on the opposite side of said pivot from the center of mass whereby independent vibrations may be set up which tend to damp the airfoil vibrations.

19. In an airplane, opposite wings, each of said wings provided with a normally floating angularly displaceable trailing flap, each of said opposite wing flaps provided with a weight forward of the flap axis of displacement to thereby forwardly overbalance the flap and continuously tend to cause the trailing edge of the flap to raise relative to the wing, and control mechanism operatively connected with said opposite floating forwardly overbalanced flaps for arbitrarily imposing differential displacement of said opposite flaps for roll control, and the said control mechanism constructed and arranged for floating of said flaps in any position to which said flaps are actuated by said control mechanism.

20. In an airplane wing, a normally floating vertically swingable wing flap forming a trailing portion of the wing, a weight on the flap forwardly of the flap axis of swing to forwardly overbalance the flap and continuously tend to swing the flap upwardly relative to the wing, and a spring connected to the flap and arranged to apply a moment to the flap of a substantially constant magnitude to oppose the action of said overbalancing weight to a degree to cause the flap to balance at a desired angle relative to the wing under the other forces to which the flap is subjected at a particular condition of smooth flight.

21. In an airplane wing, in combination, a normally floating trailing wing flap mounted for vertical swinging, a weight on the flap forward of the flap axis of swing to thereby forwardly overbalance the flap and continuously tend to swing the flap upwardly relative to the wing, a spring connected with the flap and constructed and arranged to apply a moment to the flap of a magnitude to oppose the action of said overbalancing weight to a degree to cause the flap to balance at a desired angle relative to the wing at a particular condition of smooth flight, and means operatively associated with said spring for adjusting the spring to change the magnitude of the moment applied thereby to the flap to change the angle at which the flap is balanced under the said particular condition of smooth flight.

22. In an airplane the combination of, a first air foil attached to said airplane, a second air foil pivotally connected to the first air foil on an axis adjacent the rear edge thereof, said second air foil having its center of mass ahead of the pivotal axis and its center of pressure to the rear of the pivotal axis, resilient means connecting said second air foil to said first air foil independently of said pivotal connection, said resilient means permitting movement of said second air foil relative to said first air foil whereby movement of said first air foil will cause tilting of said second air foil relative thereto to thereby produce a restoring force on the first air foil.

GEORGE W. DE BELL.